Figures 2A, 2B, 2C:
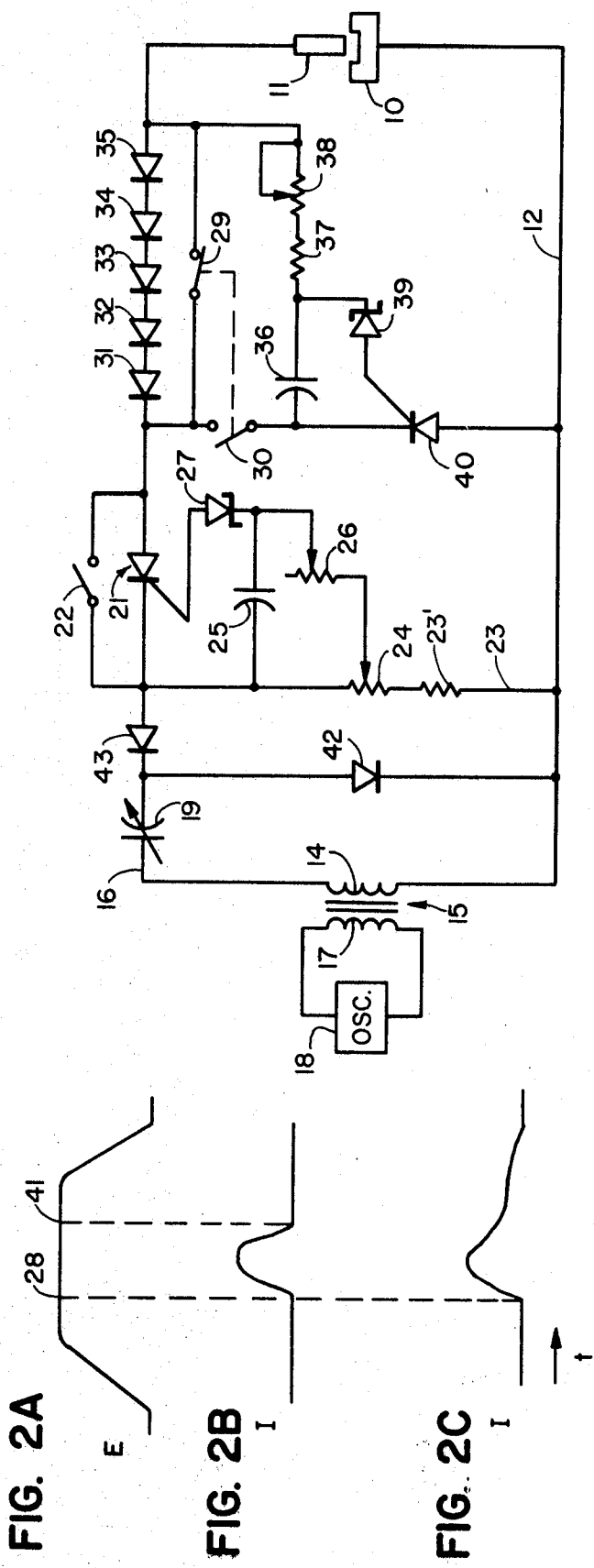

United States Patent

[11] 3,582,600

| | | |
|---|---|---|
| [72] | Inventor | Harry D. Kauffman<br>Cincinnati, Ohio |
| [21] | Appl. No. | 799,597 |
| [22] | Filed | Feb. 17, 1969 |
| [45] | Patented | June 1, 1971 |
| [73] | Assignee | Cincinnati Milacron Inc.<br>Cincinnati, Ohio |

[54] METHOD AND APPARATUS FOR ELECTRICAL DISCHARGE MACHINING BY FORE AND/OR AFT SHORTENED VOLTAGE INPUTS
29 Claims, 4 Drawing Figs.

| [52] | U.S. Cl. | 219/69 |
|---|---|---|
| [51] | Int. Cl. | B23p 1/00 |
| [50] | Field of Search | 219/69 P, 69 C, 69 F |

[56] References Cited
UNITED STATES PATENTS

| 3,020,448 | 2/1962 | Fefer | 219/69(P)X |
|---|---|---|---|
| 3,056,065 | 9/1962 | Porterfield | 219/69(P)X |

*Primary Examiner*—J. V. Truhe
*Assistant Examiner*—R. O'Neill
*Attorney*—Frank C. Leach, Jr.

ABSTRACT: A series of sinusoidal voltage pulses is applied to a spark discharge gap of an electrical discharge machining (EDM) apparatus. Each of the pulses is fore and/or aft blocked or cut off so that each resultant gap current pulse rises and/or falls steeply adjacent to the peak of the voltage curve.

FIG. I

INVENTOR
HARRY D. KAUFFMAN

BY Frank C. Leach jr.

ATTORNEY

METHOD AND APPARATUS FOR ELECTRICAL DISCHARGE MACHINING BY FORE AND/OR AFT SHORTENED VOLTAGE INPUTS

In EDM apparatuses, it is desired to apply a high peak current for a relatively short period of time through the machining gap to produce the spark discharge. This arrangement produces the most effective metal removal of the workpiece.

When utilizing a power source having a sinusoidal wave form, either clipped or not clipped, it is desirable to control when the current starts to flow through the gap and when the current ceases to flow through the gap. Thus, if the waveform is clipped, for example, it would be preferred to prevent current flow through the machining or spark discharge gap until the plateau of the voltage is reached. Likewise, it would be preferred to stop current flow through the gap before the voltage starts to decrease.

The present invention satisfactorily solves the foregoing problem by providing control means for determining when current flow from a power source through the machining gap starts and stops. Thus, the present invention permits the utilization of a sinusoidal waveform for an EDM apparatus in which a high peak energy is applied for a short period of time.

An object of this invention is to provide a method and apparatus so that an applied varying voltage is at its minimum rate of change for controlling when a spark discharge exists across a machining or spark discharge gap of an EDM apparatus.

Another object of this invention is to provide a method and apparatus for controlling the supply of energy to a machining gap of an EDM apparatus so that a selected level of energy is supplied to the machining gap during machining.

Other objects of this invention will be readily perceived from the following description, claims, and drawing.

This invention relates to an improvement in an electrical machining apparatus for removing material from a conductive workpiece by spark discharges across a machining gap between the workpiece and a tool electrode. The improvement comprises first means connected across the gap to supply current thereto for a predetermined period of time and second means to prevent the current from being supplied from the first means to the gap for a first portion of the predetermined period of time.

This invention also relates to an improvement in an electrical machining apparatus for removing material from a conductive workpiece by spark discharges across a machining gap between the workpiece and a tool electrode. The improvement comprises first means connected across the gap to supply current thereto for a predetermined period of time and second means to stop the current from being supplied from the first means to the gap before the predetermined period of time has elapsed.

The invention further relates to a method for removing material from a conductive workpiece by spark discharges across a machining gap between the workpiece and a tool electrode. The method comprises supplying a current for a predetermined period of time from a power source connected across the gap and preventing the current from being supplied through the gap for a first portion of the predetermined period of time.

This invention still further relates to a method for removing material from a conductive workpiece by spark discharges across the machining gap between the workpiece and a tool electrode. The method comprises supplying a current for a predetermined period of time from a power source connected across the gap and stopping the supply of current through the gap before the predetermined period of time has elapsed.

The attached drawing illustrates a preferred embodiment of the invention, in which:

FIG. 1 is a circuit diagram of the control of the present invention; and

FIGS. 2A—2C are timing charges showing the relation of current and voltage in accordance with the control of the present invention.

Referring to the drawing and particularly FIG. 1, there is shown a conductive workpiece 10 and a tool electrode 11. The workpiece 10 may be supported on a suitable base (not shown) in the well-known manner. The tool electrode 11 is disposed adjacent the workpiece 10 and is adapted to be moved toward and away from the workpiece 10 in the well-known manner such as when there is a short circuit therebetween.

The workpiece 10 is connected by a line 12 to one side of a winding or coil 14 of a transformer 15, which functions as a power source. The tool electrode 11 is connected by a line 16 to the other side of the winding 14.

The winding 14 is the secondary winding of the transformer 15, which has its primary winding 17 connected to an oscillator 18. Thus, the frequency with which the current is supplied to the machining gap between the workpiece 10 and the tool electrode 11 is determined through selecting the frequency of the oscillator 18.

During one-half of each AC cycle, a capacitor 19, which is in the line 16, is charged from the winding 14. The capacitor 19 is variable to produce currents of different magnitudes through the machining gap during the other half of the AC cycle when a spark discharge is created across the machining gap. The current flow through the machining gap is directly proportional to the size of the capacitor 19. Thus, when the size of the capacitor 19 is increased, the magnitude of the current flow through the gap is increased.

During the next half of the cycle after the capacitor 19 has been charged, current flows from the winding 14 and the capacitor 19 through the line 12 to the workpiece 10. When the dielectric in the gap ionizes, the current flows through the gap to the tool electrode 11 and the line 16.

The voltage waveform, which would be produced without the present invention between the workpiece 10 and the tool electrode 11, is shown in FIG. 2A. The waveform is a clipped sinusoidal waveform although it could be a sinusoidal waveform if desired.

Without the present invention, the waveform of the current would be similar to that shown for the voltage of FIG. 2A. However, by using the present invention, the current through the machining gap may be controlled to produce a waveform such as that shown in FIG. 2B.

The line 16 has a silicon controlled rectifier 21 therein. When the silicon controlled rectifier 21 is not energized and a manually operable switch 22, which is in parallel with the silicon controlled rectifier 21, is open, current cannot flow through the machining gap. Instead, the current flows through a line 23, which connects the lines 12 and 16 to each other and is in parallel with the machining gap to provide a shunt path for the current. The line 23 has a resistor 23' and a variable resistor 24 therein. When the current flows through the line 23, a capacitor 25 is charged through the resistor 24 and a potentiometer 26. With the present invention the voltage across the line 23, between the line 12 and the cathode of the silicon controlled rectifier 21, is the same as that shown in FIG. 2A.

When the capacitor 25 charges to a predetermined potential, a Zener diode 27, which connects the capacitor 25 with the gate of the silicon controlled rectifier 21, breaks down whereby the potential on the capacitor 25 is supplied to the gate of the silicon controlled rectifier 21. When this occurs, the silicon controlled rectifier 21 is turned on so that it ceases to block the line 16 and allows current to flow through the gap to produce a spark discharge between the workpiece 10 and the tool electrode 11. This is shown occurring at 28 in FIGS. 2A—2C. It will be observed that this is along the plateau of the clipped voltage waveform.

By varying the resistance of the resistor 24 and/or the potentiometer 26, the time at which the silicon controlled rectifier 21 is turned on may be varied as desired. Likewise, the capacitor 25 could be variable, if desired, to permit further selection of the time when the silicon controlled rectifier 21 is turned on.

If it is desired to turn off the current flow through the machining gap before the flow of current from the winding 14 changes direction, a manually operable switch 29 must be open and a manually operable switch 30 must be closed before machining starts. The switches 29 and 30 are connected to each other so that one is open when the other is closed.

When the manually operable switch 29 is closed as shown in FIG. 1, a plurality of series connected diodes 31—35 is bypassed. However, when the switch 29 is open and the switch 30 is closed, current must flow through the diodes 31—35 when the silicon controlled rectifier 21 is turned on. This produces a voltage drop across the diodes 31—35.

This voltage drop across the diodes 31—35 of fixed magnitude results in a capacitor 36 being charged through a resistor 37 of fixed magnitude and a potentiometer 38 by the current flowing through the machining gap. When the capacitor 36 is charged to a predetermined potential, a Zener diode 39, which connects the capacitor 36 with the gate of a silicon controlled rectifier 40, breaks down whereby the charge on the capacitor 36 is supplied to the gate of the silicon controlled rectifier 40. When this occurs, the silicon controlled rectifier 40 turns on and provides a shunt path from the line 12 to the line 16. This causes the spark discharge across the gap to be extinguished and no current to flow through the gap since it flows through the silicon controlled rectifier 40.

Thus, the silicon controlled rectifier 40 may be employed to turn off the current at 41 (see FIGS. 2A and 2B). The time, which is indicated by 41, may be changed as desired through varying the resistance of the potentiometer 38. Likewise, the capacitor 36 could be variable, if desired, to permit varying when the silicon controlled rectifier 40 is turned on.

Furthermore, because of the Zener diode 39 breaking down at a selected potential, the silicon controlled rectifier 40 also protects the tool electrode 11 from being damaged due to high energy short conditions. Thus, if there were a short, the capacitor 36 would charge much more rapidly whereby the silicon controlled rectifier 40 would turn on much more rapidly to shunt the current from the discharge gap. Therefore, the control of the present invention not only regulates when the current flow through the gap is stopped so as to obtain a maximum amount of removal of metal from the workpiece but it also protects the tool electrode 11 from damage by high energy shorts.

Considering the operation of the present invention, the capacitor 19 is charged during one-half of the AC cycle by current flow through the capacitor 19 and a diode 42. A diode 43 blocks the current from flowing through the line 16 to the tool electrode 11 during this half of the cycle.

During the next half cycle, the current flows from the winding 14 of the transformer 15 to the line 12. The capacitor 19 also discharges in this direction at this time.

With the manually operable switch 22 open, the current flows through the line 23 and the resistors 23' and 24 during the first portion of the period of the half cycle in which current is flowing to the line 16 from the transformer winding 14 via the line 12. When the capacitor 25 charges to the selected potential, the Zener diode 27 breaks down and the silicon controlled rectifier 21 turns on. When this occurs, current flows through the gap because of its much smaller resistance in comparison with the resistors 23' and 24.

If the switch 30 is closed and the switch 29 is opened, the capacitor 36 is charged when current flows through the machining gap. When the capacitor 36 reaches a selected potential as determined by the values of the capacitor 36, the resistor 37, and the potentiometer 38, the Zener diode 39 breaks down, and the silicon controlled rectifier 40 turns on. This produces a shunt path for the current from the transformer 14 and the capacitor 19 whereby current ceases to flow through the machining gap and the spark discharge is extinguished.

While both the silicon controlled rectifiers 21 and 40 have been described as being employed, it should be understood that only one of the silicon controlled rectifiers 21 and 40 may be used if desired. Thus, for example, the switches 29 and 30 could be in the position shown in FIG. 1 whereby only the silicon controlled rectifier 21 would be employed; this would determine only when the current starts to flow through the machining gap, and the current would continue to flow through the gap until the transformer winding 14 causes the current to change direction. This would produce a current waveform as shown in FIG. 2C.

Likewise, if the switch 22 is closed, the switch 29 is open, and the switch 30 is closed, only the silicon controlled rectifier 40 would be employed; this would result in the current starting to flow through the gap as soon as the transformer winding 14 supplies current to the line 12. In this arrangement, only the time when the current flow through the gap is stopped before the winding 14 causes the current to cease to flow to the line 12 would be determined or controlled.

An example of parameters of the circuit are as follows:

Resistors in ohms:
  23'_____ 60.
  24_____ [1]40.
  26_____ Variable from 0 to 125.
  37_____ 1.
  38_____ Variable from 0 to 20.
Capacitors
  25_____ 1 microfarad.
  36_____ 5 microfarads.

[1] Variable from 0 to 20 in circuit to gate of silicon controlled rectifier 21.

Both of the Zener diodes break down at 3.3 volts.

With the foregoing circuit, the frequency at which the spark discharges occur may be changed by changing the frequency of the oscillator 18. The time at which the current starts to flow through the spark discharge gap is determined by when the silicon controlled rectifier 21 turns on. The time when the current stops flowing through the gap is determined by when the silicon controlled rectifier 40 turns on. This assumes that both the silicon controlled rectifiers 21 and 40 are employed.

While the present invention has been described with the silicon controlled rectifiers 21 and 40 used as the switch control means, it should be understood that any other type of control means, which is responsive to a signal, may be employed. For example, transistors could be utilized instead of the silicon controlled rectifiers 21 and 40.

An advantage of this invention is that it insures that energy is dissipated across the machining gap of an EDM apparatus in a short period of time. Another advantage of this invention is that it allows selection as to the time when current flows starts and/or stops through a machining gap of an EDM apparatus.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. In an electrical machining apparatus for removing material from a conductive workpiece by spark discharges across a machining gap between the workpiece and a tool electrode, the improvement comprising:
   a power source producing a varying voltage output for a predetermined period of time with the voltage output having a minimum rate of change during at least a portion of the predetermined period of time;
   means to connect said power source across the gap to supply current thereto during the predetermined period of time;
   means to prevent said connecting means from being effective for a first portion of the predetermined period of time to prevent the current from being supplied from said power source to the gap for the first portion of the predetermined period of time;

and means to render said preventing means ineffective to allow flow of the current to the gap when the voltage output of said power source is at the minimum rate of change.

2. The improvement according to claim 1 including: means to stop the current from being supplied from said power source to the gap before the predetermined period of time has elapsed and while the voltage output of said power source is at the minimum rate of change; and said stopping means including means responsive to the energy supplied to the gap during the current flow through the gap to stop the current flow through the gap when a selected level of energy has been supplied to the gap and while the voltage output of said power source is at the minimum rate of change.

3. The improvement according to claim 2 in which: said stopping means includes:
means to shunt the current from the gap by connecting the two sides of said power source to each other;
means to block said shunt means;
and means to tender said blocking means of said stopping means ineffective before the predetermined period of time has elapsed, said rendering means including said responsive means.

4. The improvement according to claim 3 in which: said rendering means of said stopping means includes:
means to store a charge created when the current flows through the gap;
and said responsive means is responsive to a total charge on said storage means reaching a selected total charge to render said blocking means of said stopping means ineffective.

5. The improvement according to claim 4 in which: said preventing means includes:
means to block current flow from one side of the gap to one side of said power source;
and means to connect the other side of said power source between said blocking means of said preventing means and the one side of said power source to provide a path for the current from said power source when said blocking means of said preventing means is effective;
and said rendering means rendering said blocking means of said preventing means ineffective after the first portion of the predetermined period of time has elapsed, said rendering means becoming effective to render said blocking means ineffective when the output voltage of said power source is at the minimum rate of change.

6. The improvement according to claim 3 in which: said preventing means includes:
means to block current flow from one side of the gap to one side of said power source;
and means to connect the other side of said power source between said blocking means of said preventing means and the one side of said power source to provide a path for the current from said power source when said blocking means of said preventing means is effective;
and said rendering means rendering said blocking means of said preventing means ineffective after the first portion of the predetermined period of time has elapsed, said rendering means becoming effective to render said blocking means ineffective when the output voltage of said power source is at the minimum rate of change.

7. The improvement according to claim 2 in which said stopping means has means to vary the time at which said stopping means stops supply of current from said power source to the gap by varying when said responsive means of said stopping means responds to the selected level of energy supplied to the gap during the current flow through the gap.

8. The improvement according to claim 7 in which said rendering means has means to vary the time length of the first portion of the predetermined period of time to change the time at which said rendering means renders said preventing means ineffective to insure that said preventing means becomes ineffective when the voltage output of said power source is at the minimum rate of change.

9. The improvement according to claim 2 in which: said responsive means of said stopping means includes:
means to store a charge created when the current flows through the gap;
and means to render said stopping means effective when the total charge on said storage means reaches a selected total charge.

10. The improvement according to claim 1 in which: said preventing means includes:
means to block current flow from one side of the gap to one side of said power source;
and means to connect the other side of said power source between said blocking means and the one side of said power source to provide a path for the current from said power source when said blocking means is effective;
and said rendering means rendering said blocking means ineffective after the first portion of the predetermined period of time has elapsed, said rendering means becoming effective to render said blocking means ineffective when the voltage output of said power source is at the minimum rate of change.

11. The improvement according to claim 10 including means to vary when said rendering means renders said blocking means ineffective to vary the length of the first portion of the predetermined period of time.

12. The improvement according to claim 1 in which: said rendering means has means to vary the time length of the first portion of the predetermined period of time; and said varying means changes the time at which said rendering means renders said preventing means ineffective to insure that said preventing means becomes ineffective when the voltage output of said power source is at the minimum rate of change.

13. The improvement according to claim 1 in which: said power source produces a varying voltage output having a maximum with a zero rate of change for a predetermined period of time;
and said rendering means renders said preventing means ineffective to allow flow of current through the gap when the voltage output of said power source is at the maximum and has the zero rate of change.

14. In an electrical machining apparatus for removing material from a conductive workpiece by spark discharges across a machining gap between the workpiece and a tool electrode, the improvement comprising:
a power source producing a varying voltage output for a predetermined period of time with the voltage output having a minimum rate of change during at least a portion of the predetermined period of time;
means to connect said power source across the gap to supply current thereto during the predetermined period of time;
means to stop the current from being supplied from said power source to the gap before the predetermined period of time has elapsed and while the voltage output of said power source is at the minimum rate of change;
and said stopping means including means responsive to the energy supplied to the gap during the current flow through the gap to stop the current flow through the gap when a selected level of energy has been supplied and while the voltage output of said power source is at the minimum rate of change.

15. The improvement according to claim 14 in which: said stopping means includes:
means to shunt the current from the gap by connecting the two sides of said power source to each other;
means to block said shunt means;
and means to render said blocking means ineffective before the predetermined period of time has elapsed, said rendering means including said responsive means of said stopping means.

16. The improvement according to claim 15 in which:
said rendering means includes:
means to store a charge created when the current flows through the gap;
and said responsive means is responsive to a total charge on said storage means reaching a selected total charge to render said blocking means of said stopping means ineffective.

17. The improvement according to claim 15 including means to vary when said rendering means renders said blocking means ineffective to vary the time at which said stopping means stops supply of current from said power source to the gap, said varying means varying when said responsive means of said stopping means responds to the selected level of energy supplied to the gap during the current flow through the gap.

18. The improvement according to claim 14 in which said stopping means has means to vary the time at which said stopping means stops supply of current from said power source to the gap by varying when said responsive means of said stopping means responds to the selected level of energy supplied to the gap during the current flow through the gap.

19. The improvement according to claim 14 in which:
said responsive means of said stopping means includes:
means to store a charge created when the current flows through the gap;
and means to render said stopping means effective when the total charge on said storage means reaches a selected total charge.

20. The improvement according to claim 14 in which:
said power source produces a varying voltage output having a maximum with a zero rate of change for a predetermined period or time;
and said stopping means stops the flow of current to the gap before the voltage output of said power source decreases from the maximum and ceases to have the zero rate of change.

21. A method for removing material from a conductive workpiece by spark discharges across a machining gap between the workpiece and a tool electrode, the method comprising:
producing a varying voltage output for a predetermined period of time from a power source with the voltage output having a minimum rate of change during at least a portion of the predetermined period of time;
connecting the power source across the gap to supply current to the gap during the predetermined period of time;
and preventing connection of the power source across the gap for a first portion of the predetermined period of time until the voltage output of the power source is at the minimum rate of change to prevent the current from being supplied through that gap for the first portion of the predetermined period of time.

22. The method according to claim 21 including stopping the supply of current through the gap before the predetermined period of time has elapsed by stopping the current flow through the gap when the energy supplied to the gap during the current flow through the gap reaches a selected level.

23. The method according to claim 22 including varying the time when the supply of current through the gap is stopped by varying when the stopping of the current occurs due to the energy supplied to the gap during the current flow through the gap reaching the selected level.

24. The method according to claim 23 including varying the first portion of the predetermined period of time to insure that the voltage output of the power source is at the minimum rate of charge when the current ceases to be prevented from flowing to the gap.

25. The method according to claim 21 including varying the first portion of the predetermined period of time to insure that the varying voltage output of the power source is at the minimum rate of change when the current ceases to be prevented from flowing to the gap.

26. The method according to claim 22 including:
storing a charge created when the current flows through the gap;
and stopping supply of current through the gap when the stored charge reaches a selected total charge.

27. The method according to claim 21 including:
causing the power source to produce a varying voltage output having a maximum with a zero rate of change for a predetermined period of time;
and blocking the current flow through the gap until the voltage output of the power source is at the maximum and has the zero rate of change.

28. A method for removing material from a conductive workpiece by spark discharges across a machining gap between the workpiece and a tool electrode, the method comprising:
producing a varying voltage output for a predetermined period of time from s power source with the voltage output having a minimum rate of change during at least a portion of the predetermined period of time;
connecting the power source across the gap to supply current to the gap during the predetermined period of time;
and stopping the supply of current through the gap from the power source before the predetermined period of time has elapsed and while the voltage output of the power source is at the minimum rate of change by stopping the current flow through the gap when energy supplied to the gap during the current flow therethrough reaches a selected level.

29. The method according to claim 28 including:
causing the power source to produce a varying voltage output having a maximum with a zero rate of change for a predetermined period of time;
and stopping the flow of current through the gap before the voltage output of the power source ceases to be a maximum and have the zero rate of change.

UNITED STATES PATENT OFFICE
CERTIFICATE OF CORRECTION

Patent No. 3,582,600            Dated    June 1, 1971

Inventor(s)    Harry D. Kauffman

It is certified that error appears in the above-identified patent and that said Letters Patent are hereby corrected as shown below:

Column 1, lines 11 and 22, Column 2, lines 34, 37, 38, 39, 40, 43 and 69, Column 4, line 8, "waveform", each occurrence, should read -- wave form --. Column 1, lines 25 and 26, cancel "so that an applied varying voltage is at its minimum rate of change"; line 28, after "paratus" insert -- so that an applied varying voltage is at its minimum rate of change --; line 54, "The" should read -- This --; line 73, "charges" should read -- charts --. Column 4, line 19, cancel the colon; lines 20, 21, 22, 23, 24, 26 and 27, cancel the period, each occurrence; line 31, before "Both" insert -- Zener Diodes --, in the same manner as "Resistors in ohms" in line 19 and "Capacitors" in line 25 appear. Column 5, line 21, "tender" should read -- render --. Column 6, line 27, before "length" insert -- time --. Column 7, line 33, "or" should read -- of --; line 52, "that" should read -- the --. Column 8, line 12, "charge" should read -- change --; line 36, "s" should read -- a --.

Signed and sealed this 7th day of March 1972.

(SEAL)
Attest:

EDWARD M. FLETCHER, JR.            ROBERT GOTTSCHALK
Attesting Officer                 Commissioner of Patents